United States Patent
Averbuch et al.

(10) Patent No.: US 10,151,592 B2
(45) Date of Patent: Dec. 11, 2018

(54) MAP MATCHING QUALITY EVALUATION

(71) Applicant: HERE Global B.V., Veldhoven (NL)

(72) Inventors: Alex Averbuch, Buffalo-Grove, IL (US); Dongwook Jang, Lisle, IL (US); Gavril Giurgiu, Deerfield, IL (US)

(73) Assignee: HERE Global B.V., Eindhoven (NL)

( * ) Notice: Subject to any disclaimer, the term of this patent is extended or adjusted under 35 U.S.C. 154(b) by 69 days.

(21) Appl. No.: 15/141,070

(22) Filed: Apr. 28, 2016

(65) Prior Publication Data

US 2017/0314934 A1 Nov. 2, 2017

(51) Int. Cl.
*G01C 21/00* (2006.01)
*G01C 21/30* (2006.01)
*G01C 21/34* (2006.01)
*G01S 19/42* (2010.01)

(52) U.S. Cl.
CPC ............ *G01C 21/30* (2013.01); *G01C 21/34* (2013.01); *G01S 19/42* (2013.01)

(58) Field of Classification Search
CPC .................................................. G01C 21/30
See application file for complete search history.

(56) References Cited

U.S. PATENT DOCUMENTS

| | | | |
|---|---|---|---|
| 7,516,041 B2 | 4/2009 | Smartt et al. | |
| 8,938,252 B2 * | 1/2015 | Alles | G01S 5/021 342/357.29 |
| 9,261,376 B2 * | 2/2016 | Zheng | G01C 21/3484 |
| 9,536,146 B2 * | 1/2017 | Zheng | G08G 1/0112 |
| 2008/0004802 A1 * | 1/2008 | Horvitz | G01C 21/3415 701/533 |
| 2008/0082254 A1 | 4/2008 | Huhtala et al. | |
| 2008/0091347 A1 * | 4/2008 | Tashiro | G01C 21/30 701/448 |
| 2008/0120030 A1 * | 5/2008 | Yamada | G01C 21/26 701/415 |
| 2008/0201073 A1 * | 8/2008 | Adachi | G01C 21/30 701/414 |
| 2009/0005972 A1 * | 1/2009 | de Koning | G01C 21/30 701/532 |
| 2009/0177644 A1 * | 7/2009 | Martinez | G06Q 30/02 |
| 2009/0201149 A1 * | 8/2009 | Kaji | G01C 21/20 340/539.13 |
| 2009/0210388 A1 * | 8/2009 | Elson | G06F 17/30241 |

(Continued)

OTHER PUBLICATIONS

Kubicka, Matej, et al. "Dataset for testing and training of map-matching algorithms." Intelligent Vehicles Symposium (IV), 2015 IEEE. IEEE, Jul. 2015.

(Continued)

*Primary Examiner* — Truc M Do
(74) *Attorney, Agent, or Firm* — Lempia Summerfield Katz LLC

(57) ABSTRACT

A method is provided for generating ground truth data for positional data with matched road segments. The method comprises identifying a route comprising one or more road segments. Positional data, collected while traveling the route, is received. A plurality of candidate road segments is identified. The positional data is matched to one of the plurality of candidate road segments, wherein the one or more road segments are prioritized for matches.

17 Claims, 12 Drawing Sheets

(56) References Cited

U.S. PATENT DOCUMENTS

| | | | | |
|---|---|---|---|---|
| 2010/0070170 A1* | 3/2010 | Adachi | ............... | G01C 21/34 |
| | | | | 706/46 |
| 2010/0185388 A1* | 7/2010 | Horvitz | ............. | G01C 21/3492 |
| | | | | 701/465 |
| 2010/0312472 A1* | 12/2010 | Hilbrandie | ............. | G01C 21/32 |
| | | | | 701/533 |
| 2011/0145268 A1* | 6/2011 | Agarwal | ........... | G06F 17/30737 |
| | | | | 707/765 |
| 2011/0241935 A1* | 10/2011 | Miocinovic | ............ | G01C 21/30 |
| | | | | 342/357.31 |
| 2011/0288771 A1* | 11/2011 | Mazlum | ................ | G01S 19/50 |
| | | | | 701/469 |
| 2013/0030690 A1* | 1/2013 | Witmer | ................ | G01C 21/32 |
| | | | | 701/409 |
| 2014/0146079 A1* | 5/2014 | Huang | ................ | G01C 21/00 |
| | | | | 345/629 |
| 2015/0098659 A1* | 4/2015 | Huang | ............. | G06F 17/30247 |
| | | | | 382/204 |
| 2015/0153187 A1* | 6/2015 | Dong | .................... | G01C 21/30 |
| | | | | 701/446 |
| 2017/0314938 A1* | 11/2017 | Wang | .................... | G01C 21/32 |

OTHER PUBLICATIONS

Griffin, Terry, Yan Huang, and Shawn Seals. "Routing-based map matching for extracting routes from GPS trajectories." proceedings of the 2nd International Conference on Computing for Geospatial Research & Applications. ACM, 2011.

* cited by examiner

MAP MATCHING QUALITY EVALUATION

FIELD

The following disclosure relates to navigation devices or services.

BACKGROUND

Navigation services use positional data to locate vehicles or devices. A simple location on its own may not be useful to a user. The location must be matched to a digital map. Map matching is the process used to match the location with a digital map. Algorithms and software are used to associate or match the location with a known position on a map, e.g. the correct road segment.

Map matching is an essential procedure in navigation, traffic evaluation and other location based services. However, evaluation of the map matching quality proves difficult. In a perfect map matching situation, positional data points would be aligned and matched with the correct road segments that a vehicle was actually traversing. However, errors with map matching may occur due to intrinsic positioning inaccuracy, digital map inaccuracy, or terrain induced inaccuracy. When errors occur, locations may not be mapped to the digital map or may be mapped to the wrong road or wrong segment of a road.

In order to test and evaluate map matching algorithms, actual location data is needed. However, ground truth data is difficult to procure, requiring manual observations for each point of data.

SUMMARY

In an embodiment, a method for generating ground truth data is provided. A route comprising one or more road segments is identified. Positional data is received. A plurality of candidate road segments is identified. The positional data is matched to the plurality of the road segments. The matched positional data is aggregated for a geographic region.

In an embodiment, a method for evaluating map matching algorithms using ground truth map matched data is provided. A processor identifies ground truth map matched data. Positional data from the ground truth map matched data is published. Matched data is received including a plurality of first matched road segments matched using a first map matching algorithm. The first matched road segments are compared to the ground truth matched road segments. The first map matching algorithm is scored based on the comparison.

In an embodiment, an apparatus is provided for evaluating map matching algorithms. The apparatus comprises a processor and a memory. The processor is configured to publish positional data from ground truth map matched data. The processor receives candidate map matched road segments generated by a first map matching algorithm. The processor scores the first map matching algorithm based on the candidate map matched road segments and the ground truth data.

BRIEF DESCRIPTION OF THE DRAWINGS

Exemplary embodiments of the present invention are described herein with reference to the following drawings.

DETAILED DESCRIPTION

Figure 1:
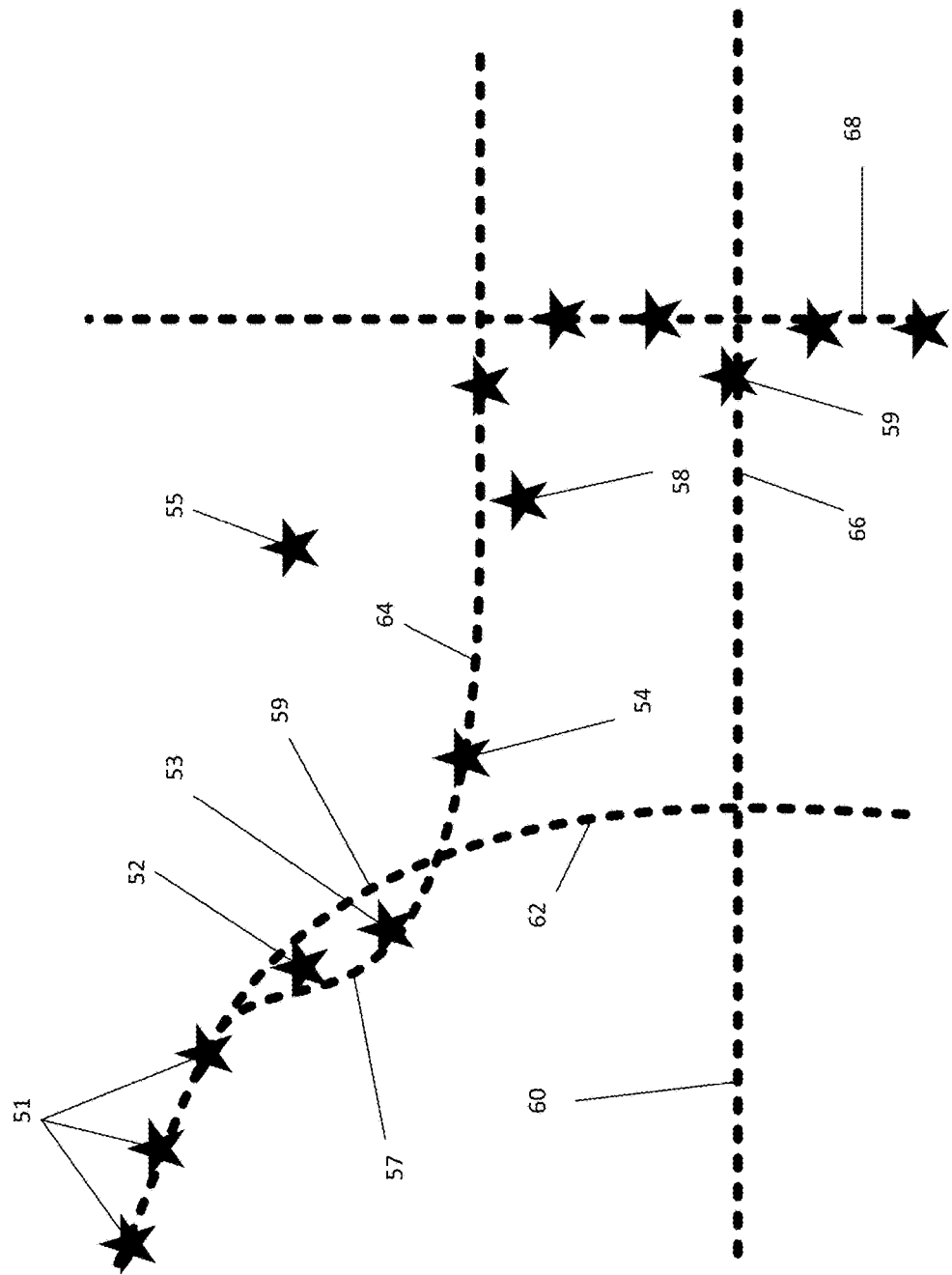
FIG. 1 illustrates an example roadway network.

FIG. 1 illustrates an example of positional data from a roadway. The positional data is represented by the stars (e.g. 51, 53). The roadway system is represented by the dotted lines 60. The roadway system 60 may include multiple sections such as links or road segments. Positional data may be collected using, for example, a Global Positioning System (GPS) embedded in a vehicle or device. In FIG. 1, there are fourteen points of positioning data (e.g. 51, 53). Each point may include a time and position.

The positional data is collected as the vehicle traverses the roadway beginning in the upper left at the first three positional data points 51. The first three positional data points 51 are clear and appear to represent a vehicle travelling on a specific roadway. These positional data points may be matched correctly by most if not all map matchers as there is little to no ambiguity regarding which road segment the positional data points are associated with. The fourth 52 and fifth 53 positional data points may be ambiguous. Both the fourth 52 and fifth 53 positional data points may be assigned to either road segment 57 (the lower segment) or road segment 59 (the upper segment). For a real-time navigation system, matching each of these positional data points to the correct road segment is vital to maintain navigation services. If for example, the fourth positional data point is matched incorrectly, the navigation system may suggest incorrect maneuvers. The sixth positional data point 54 while more aligned with a roadway may also be within the margin of error for a map matcher to select the roadway that runs north south 62 as opposed to selecting the east west roadway 64. As such, a navigation system in real time may identify either roadway as the possible location of the vehicle. The seventh positional data point 55 is not less ambiguous. It is not until the eighth positional data point 58 that the navigation system may identify that the vehicle took the east west roadway 64.

In addition to the positional data, a map matcher may also use additional data such as heading. For example, using the heading data of the sixth positional data point 54, a map matcher may be able to select the east west roadway 64 as the vehicle may have a heading that is primarily east. Even with the heading data, a map matcher may still make errors. The positional data point 59 is an example of a point that may confuse a map matcher algorithm. The point 59 may indicate that the vehicle has taken a right onto roadway 66.

However, as seen by subsequent positional data points, the vehicle appears to be continuing on roadway 68.

Due to different map matching algorithms, different positional data points may be map matched incorrectly by different map matchers. For example, the hypothetical fourth point 52 may be matched to road segment 57 by one map matcher or road segment 59 by another map matcher. In order to decipher which map matcher is correct, it is necessary to have some ground truth map matching data. A ground truth sample is a sample of positional points for which the true position is known. For example, ground truth map matching data for FIG. 1 may include verification that the fourth point 52 should be matched to road segment 57. Ground truth samples are difficult to collect and involve extensive manual procedures. For example, one technique is to first map match the data using a very expensive, high quality map matcher and then examine each GPS point by eye and decide if the map matching is correct or not. For example, in FIG. 1, the eventual path may be determined by looking at every point after the fact. An alternative method is to have personal travel the roadway and identify points manually as the positional points are collected.

The following embodiments relate to systems and methods for an automatic method to generate large ground truth samples using real positional data and in turn enabling easy and fast evaluation of various map matching algorithms. The ground truth samples may be used to quickly evaluate map matching services over wide geographic area. A client may input detailed an algorithm or positional data and map matched positions and the system provides results of map matching quality. Such a system may be used by a service to develop, test, improve and validate its map matching algorithm.

Figure 2:
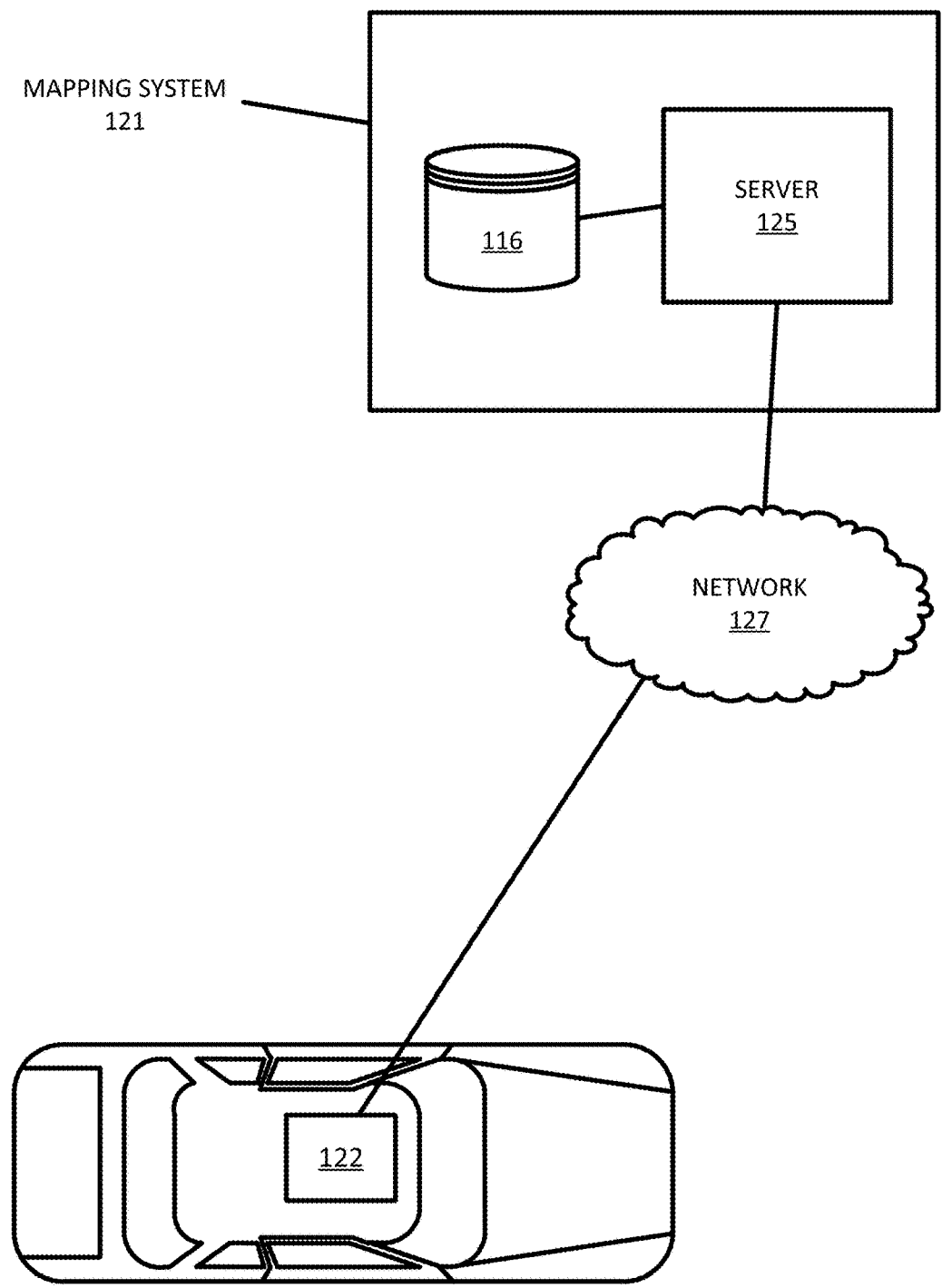
FIG. 2 illustrates an example system for generating ground truth data.

FIG. 2 illustrates an example system for generating ground truth data. The system includes one or more devices 122, a network 127, and a mapping system 121. The mapping system 121 may include a database 116 (also referred to as a geographic database 116 or map database 116) and a server 125. Additional, different, or fewer components may be included.

The mapping system 121 may include multiple servers, workstations, databases, and other machines connected together and maintained by a map developer. The mapping system 121 may be configured to match positional data with one or more road segments using one or more map matching algorithms. The mapping system 121 may also be configured to generate routes or paths between two points (nodes) or road segments on a stored map. The mapping system 121 may be configured to provide up to date information and maps to external geographic databases or mapping applications. The mapping system 121 may be configured to encode or decode map or geographic data.

Figure 3:
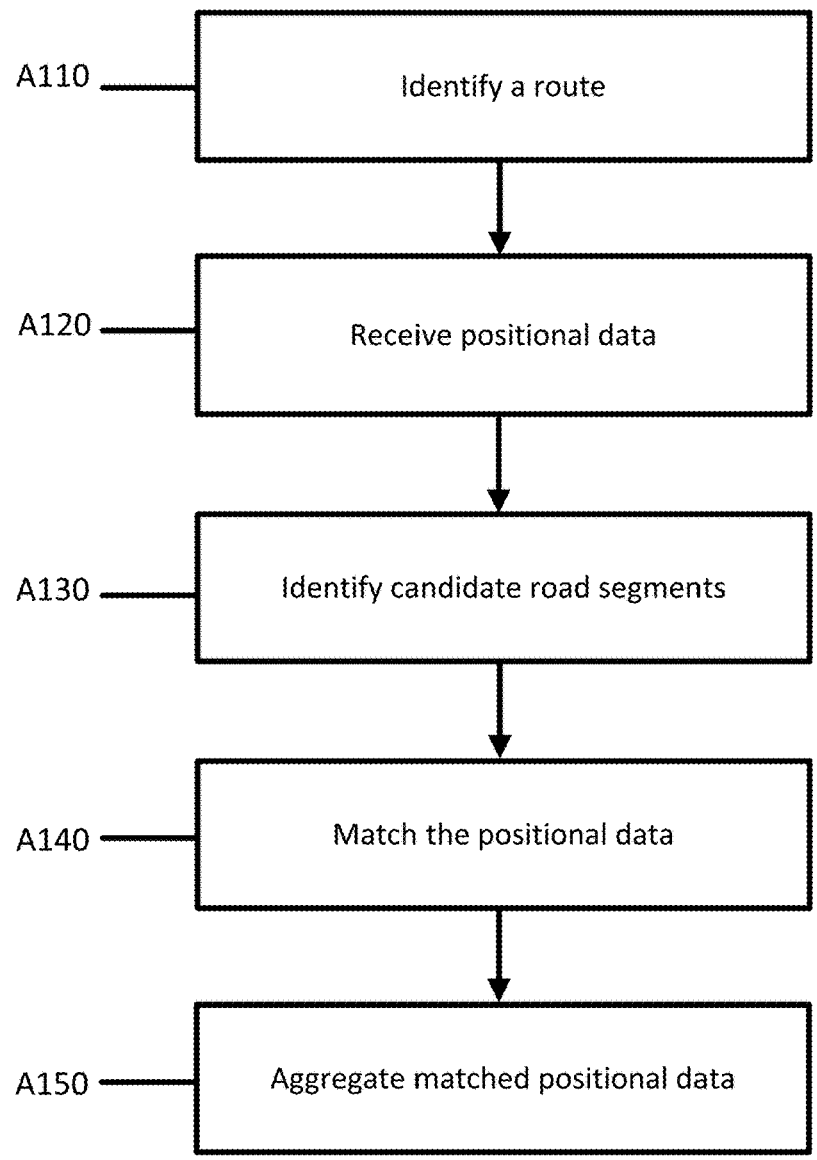
FIG. 3 illustrates an example workflow for automatically collecting map matching data.

FIG. 3 illustrates an example flow chart for automatically collecting accurate map matching data using the mapping system 121 of FIG. 2. As presented in the following sections, the acts may be performed using any combination of the components indicated in FIG. 2, FIG. 11, or FIG. 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, a route is identified by the mapping system 121. The mapping system 121 and/or database 116 may store road segment data records and node data records. The road segment data records may represent links or segments representing roads, streets, or paths that may be used for determination of one or more routes. The node data records are points corresponding to the respective links or segments of the road segment data records. The road link data records and the node data records represent a road network, such as used by vehicles, cars, and/or other entities. Alternatively, for example, the map database 123 may contain road segment and node data records or other data that represent pedestrian paths or areas in addition to or instead of the vehicle road record data.

A route may be selected by a user or generated by the mapping system 121. The route may contain road segments beginning at a starting point and ending at a destination. The starting point and destination may be entered or selected by a user. The mapping system 121 may generate the route using the starting point and destination and any preferences (such as shortest distance or time). The route may include one or more waypoints in between the starting point and the destination. The road segments in the route may be ordered sequentially.

Figure 4:
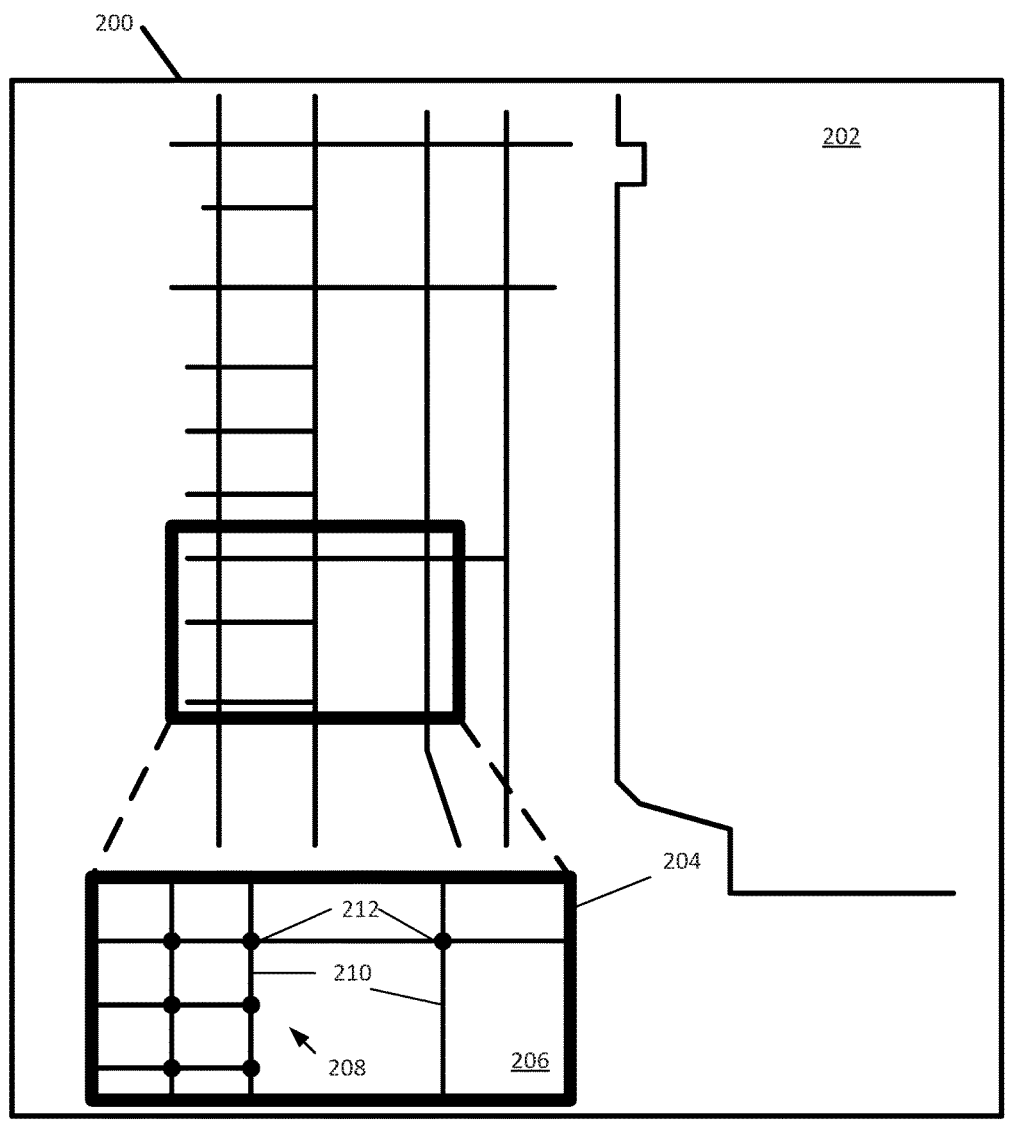
FIG. 4 illustrates an example map of a geographic region.

In order to provide navigation-related features and functions to the end user, the mapping system 121 uses the geographic database 116. The geographic database 116 includes information about one or more geographic regions. FIG. 4 illustrates a map 200 of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 4 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown associated with two nodes 212; one node represents the point at one end of the road segment and the other node represents the point at the other end of the road segment. The node 212 at either end of a road segment 210 may correspond to a location at which the road meets another road, i.e., an intersection, or where the road dead-ends. Each road segment 210 may include multiple sub-segments (or sub-links). A sub-segment may be a designated portion of the road segment 210. For example, a road segment 210 may be split into multiple sub-segments each 10 meters long.

Figure 5:
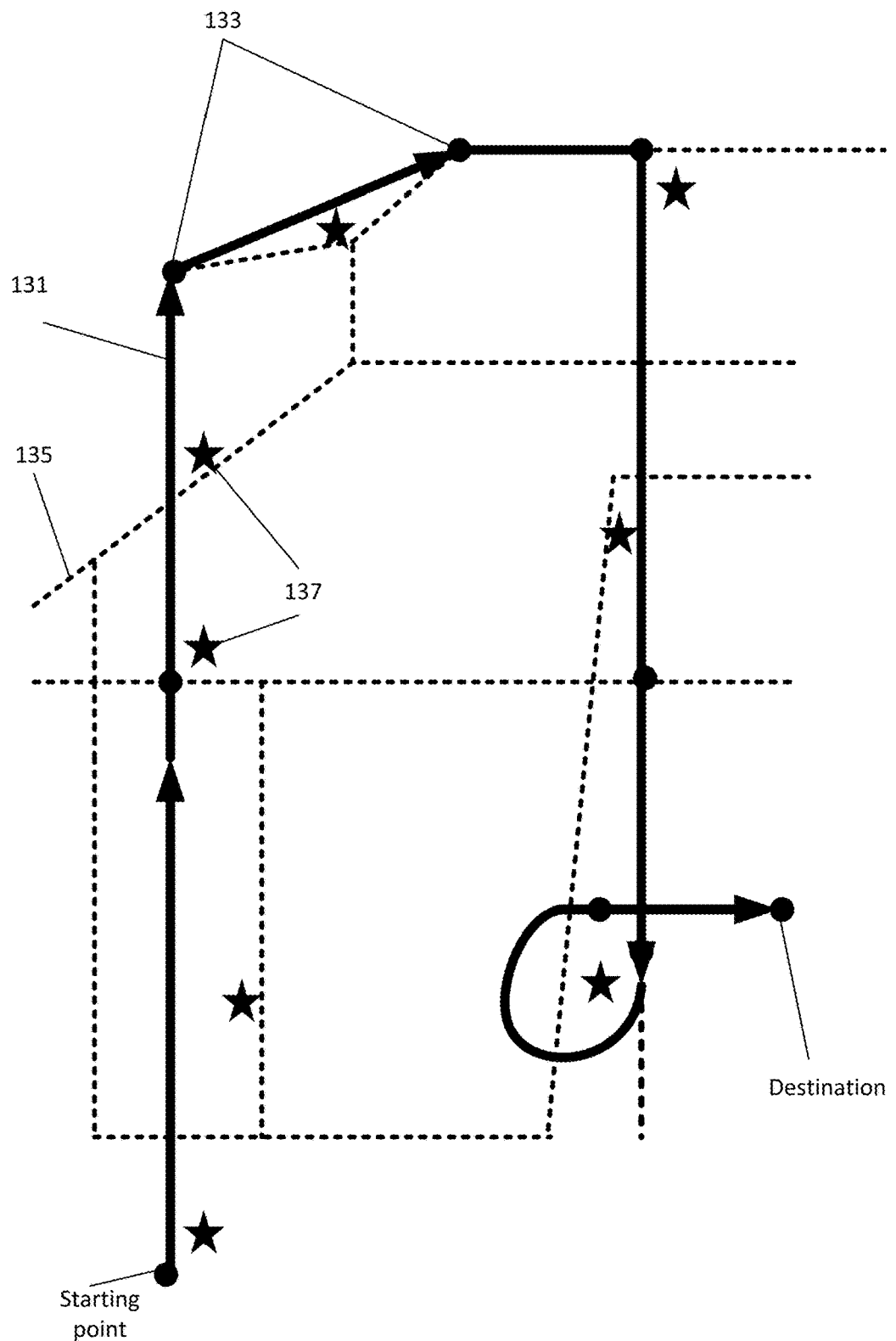
FIG. 5 illustrates an example roadway network and a selected route.

FIG. 5 illustrates a roadway network and a selected route 131. The selected route 131 is depicted by the solid line. The route 131 includes one or more road segments. Each road segment may be identified by a unique identifier or may be identified by the endpoints 133 (nodes) of the segment. Each lane and/or direction may be a separate segment. For example, a roadway with four lanes that is bidirectional may be represented by four different road segments between each node, one for each lane. Each road segment may identify the lane and the direction of travel. For FIG. 5, the roadway network has been simplified and only contains a single road segment between each node. In addition to the road segments in the route, the roadway network further contains road segments depicted by the dotted line that are not in the route (e.g. 135).

At act A120, positional data is received and/or collected. The positional data may be collected while traveling the route by a device 122. FIG. 5 illustrates positional data 137 as stars recorded by the device 122. The device 122 may be, for example, a navigation system embedded in a vehicle or a mobile device. The location of a device 122 may be identified using positional circuitry such as a GPS receiver or other positional inputs. The device 122 may be configured to measure the position of the device 122 once a period as the device 122 travels from the starting point to a destination. For example, the device 122 may take positional measurement every 1 second (s), 2 s, 5 s, among other periods. The positional measurement may be expressed in latitude and longitude, for example Latitude 41.9484384, Longitude −87.65533270000003. The positional measurement may be expressed in DMS (Degrees, Minutes, Seconds), for example Latitude N41° 56'54.37" Longitude W87° 39'19.197". Alternative methods for collecting and expressing positional data may be used.

For GPS data, there exists the possibility for errors or inaccurate measurements. An accurate positional determination from a GPS receiver requires line of sight with GPS satellites. Satellite geometry also becomes an issue when using a GPS receiver in a vehicle, near tall buildings, or in mountainous or canyon areas. When the GPS signals are blocked from several satellites, the relative position of the remaining satellites determines how accurate the GPS position will be (and the number of remaining satellites determines if a position can even be determined). As more and more of the sky is obstructed by buildings or terrain, it becomes increasingly difficult to determine a position.

Another source of error is multipath. Multipath is the result of a radio signal being reflected off an object. With GPS, multipath occurs when the signal bounces off a building or terrain before reaching the GPS receiver's antenna. The signal takes longer to reach the receiver than if the signal traveled a direct path. The added time makes the GPS receiver think the satellite is farther away than the satellite really is. The added time increases the potential for error in the overall position determination. Propagation delay due to atmospheric effects and internal clock errors may also affect accuracy.

The positional data that was collected may be used to generate a probe report. The probe report may further include other data such as temporal data, road attributes or vehicle data. Vehicle data may include data such as speed, heading, or other data from vehicle sensors.

The probe report including the positional data may be transmitted from the device 122 to the mapping system 121 though the network. In certain embodiments, the positional data is stored in the device 122 and transmitted at a later time. The positional data may also be batch transmitted when the device enters an area that allows for high bandwidth or inexpensive transmission. The positional data may be separated from the probe report and stored as a separate set of data.

At act A130, a plurality of candidate road segments in a geographic area are identified by the mapping system 121. Road segment data records may be stored in the database 116. The map database 123 may include node data records, road segment or link data records, Point of Interest (POI) data records, and other data records. More, fewer or different data records may be provided.

Different approaches may be used to identify the plurality of candidate road segments. The plurality of candidate road segments may correspond to a specific geographic region. For example, the mapping system 121 may only identify road segments within a threshold distance from a starting point or location. The plurality of candidate road segments may include each road segment that is a possible road segment given the individual pieces of positional data. To identify the plurality of candidate road segments, the mapping system 121 may identify and select all road segments within a threshold distance from each of the positional data points. The mapping system 121 may further include all adjacent road segments. For FIG. 5, the plurality of candidate road segments in a geographic area may include every road segment. FIG. 5 depicts the plurality of road segments including, both the dotted lines 135 and the identified route 131.

At act A140, the positional data is map matched to the plurality of candidate road segments by the mapping system 121. The road segments included in the route are prioritized when matching the road segments to the positional data. For example, when matching a positional point, if there is a choice between a road segment that is in the route and one that is not, the road segment that is in the route is selected. If there are two candidate road segments that are in the route, the ground truth map matcher may use distance, heading, speed, previous or subsequent roads segments, or other data to select the correct road segment. FIGS. 6A, 6B, 7A, 7B, 8A, and 8B illustrate a ground truth map matching process. FIGS. 6A, 6B, 7A, 7B, 8A, and 8B depict potential roadway configurations from FIG. 5 and how positional points may be matched. The stars in the figures are the positional data points collected, for example, in act A120.

Figure 6A:
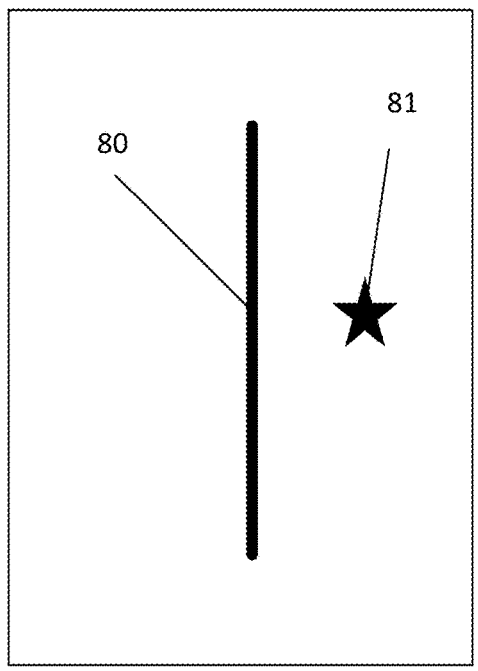
FIGS. 6A and 6B illustrate example roadway segments and positional data.

FIG. 6A depicts a single regular standalone road segment 80. The standalone road segment is one of the segments included the route. There are no other road segments within a threshold distance of the positional point 81. Since there are no other options, the ground truth map matcher matches the positional point 81 to the road segment 80. If road segment 80 is bi-directional, the map matcher may further match the positional point to the lane based on a heading.

Figure 6B:
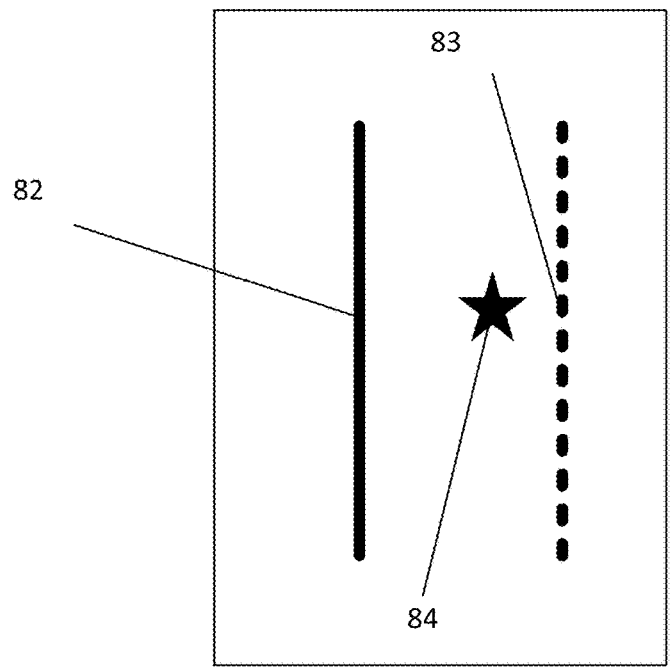

FIG. 6B depicts two parallel road segments 82 and 83. Road segment 82 is included in the route and was traversed by the vehicle. Road segment 83 is not included in the route. The positional point 84 is closer to road segment 83 than road segment 82. A standard map matcher may match the positional point with segment 83 as segment 83 is the closest segment. The ground truth matcher, after identifying segment 82 as being in the route, prioritizes and selects the correct segment 82.

Figure 7A:
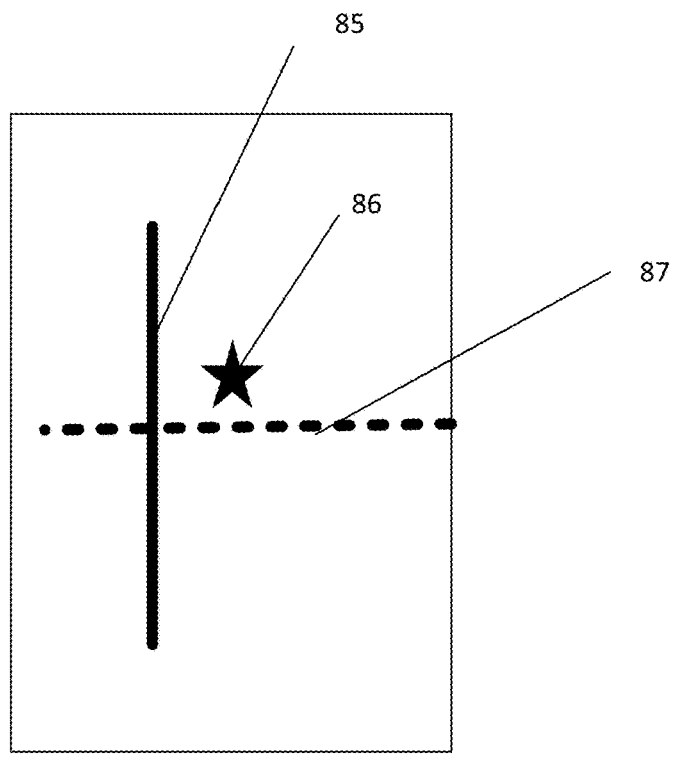
FIGS. 7A and 7B illustrate example roadway segments and positional data.

FIG. 7A depicts two intersecting road segments 85 and 87. Road segment 85 is included in the route and was traversed by the vehicle. Road segment 87 was not included in the route. A standard map matcher may select either road segment 85 or 87 as the positional point is approximately equidistant to either road segment. If the standard map matcher had access to heading, the standard map matcher may correctly identify road segment 85. The ground truth map matcher, after identifying segment 85 as being in the route, prioritizes and selects the correct segment 85.

Figure 7B:
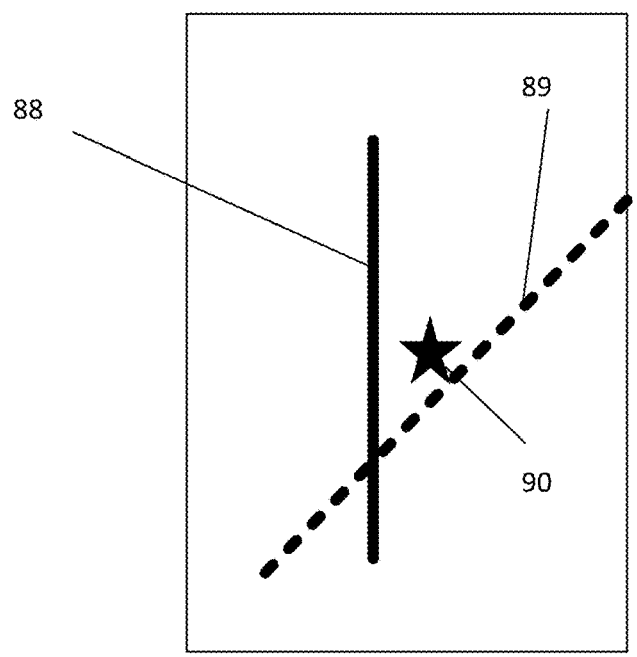

FIG. 7B depicts two intersecting road segments 88 and 89. Road segment 88 is included in the route and was traversed by the vehicle. Road segment 89 was not included in the route. A standard map matcher may select either road segment 88 and 89 as the positional point is in between the two segments. Unlike the example in FIG. 6A, heading may not be useful for the example in FIG. 6B. Both candidate segments are pointing north or north north-east respectively. If the standard map matcher had access to segment prior to and after segment 88, the map matcher may be able to identify the correct segment. For example, if the segments 88 and 89 did not intersect, but if road segment 88 was an overpass overtop of segment 89. In such an example, segment 89 may be less likely to be the correct segment as segment 89 does not connect to the previously matched segment. However, due to possible errors with matching the previous segment, even using the previously matched segment may not allow for absolute certainty. The ground truth matcher, after identifying road segment 88 as being in the route, prioritizes and selects the correct segment 82.

Figure 8A:
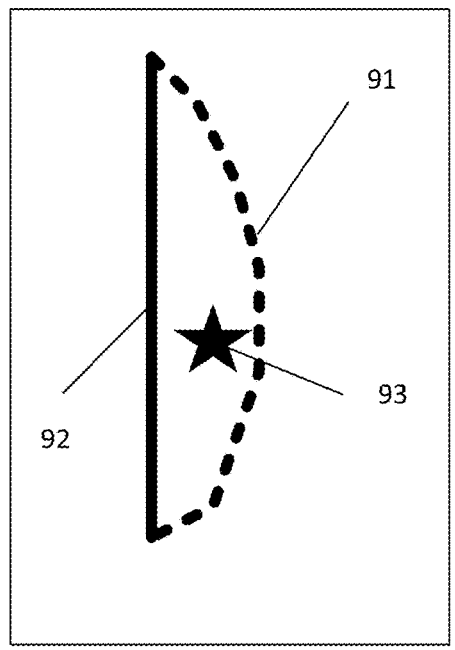
FIGS. 8A and 8B illustrate example roadway segments and positional data.

FIG. 8A depicts two road segments 91 and 92. Road segment 92 is included in the route and was traversed by the vehicle. Road segment 91 was not included in the route. The example in FIG. 8A may depict an off ramp or an island in the roadway. The road segment 91 may be a shoulder or turnoff for emergency vehicles. The correct segment may be difficult for a standard map matcher to identify as the positional point 93 is approximately equidistant from both segments, the headings are similar, and both segments share nodes. Either road segment may be selected by a standard map matcher. The ground truth map matcher prioritizes and selects the correct segment 92 as segment 92 is included in the route.

Figure 8B:
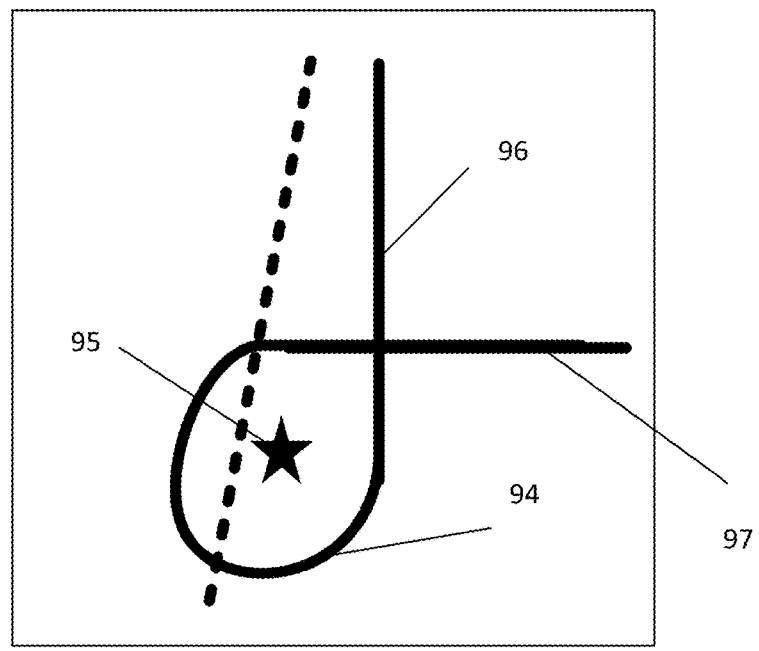

FIG. 8B depicts three road segments 94, 96, 97. Each road segment 94, 96, 97 is included in the route. The positional point 95 is approximately in the middle of the road segments 94, 96, 97. Heading may be useful in the situation as well as previously traveled road segments. For example, a standard map matcher may be able to correctly match the correct road segment if the map matcher correctly identifies the correct road segment. In this example, the vehicle traveled south on road segment 96, took an off-ramp 94 and exited along road segment 97. If a standard map matcher identified a previous road segment as the off-ramp 94, then the map matcher may exclude road segment 96 from the candidate road segments. Additionally, using heading, a standard map matcher may be able to narrow the list of candidate road segments. The ground truth map matcher may have already identified a previous road segment and subsequent road segments. The ground truth map matcher may identify the correct road segment using the prior and subsequent road segment data and the heading.

In certain embodiments, the route may not be followed exactly. In such an embodiment, the ground truth map matcher may still select a road segment. In an embodiment, a road segment from the route is not a candidate for the positional point. In this example, the ground truth map matcher does not prioritize a segment in the route, and therefore selects the best candidate using one or more stored map matching algorithms. If, for example, a road segment for a positional point is undeterminable (e.g. the positional point is past a threshold distance away from any other recorded positional point), the ground truth map matcher may exclude the positional point.

At act A150, the ground truth map matched data is aggregated for a geographic region. The ground truth map matched data may be grouped (aggregated) into sets of data which include multiple sets of data that relate to a specific region or type of roadway. The ground truth map matched data may be stored as a set or group of data. For example, each positional point and the matched road segment may be stored in the geographic database or a separate database. Additional data such as heading, speed, or other sensor data may be stored along with the ground truth map matched data. The aggregated map matched data may be published on a website or transmitted to a client in order to evaluate map matching services. Map matching quality by may be defined by two quantities: efficiency and purity. Efficiency is the fraction of map matched points out of the total number of points to be map matched. For example, a GPS sample may have 100 points and a certain map matching algorithm matches only 85 of the points and determines that the rest are too ambiguous and cannot map match the points. In this case the map matching efficiency is 85%. Purity is the fraction of correctly map matched points out of the total number of matched points. To follow the above example, if, out of 85 matched points, 70 are map matched correctly and 15 are matched wrongly, then, the purity of the map matcher is 70/85=82.3%. By using a group of aggregated ground truth map matched data, outliers or Certain map matching algorithms perform well for efficiency, but perform poorly for purity. Other map matching algorithms may only be able to match a fraction of points, but have a high purity score. Certain application have a need for a high efficiency score or a high purity score or both. Algorithms may also be evaluated on their efficiency or processing needs. For example, an algorithm that uses multiples sets of data, (e.g. GPS coordinates, speed, heading, previous locations, video and LIDAR sensors) may require additional processing power (cycles) or time to correctly identify the correct road segments. Such a map matching algorithm may perform well in both efficiency and purity but may not be useable for certain applications that require quick (time) cheap (processing cycles) solutions. Other map matching algorithms may require additional data such as heading. When heading (or another data input) is not available, these algorithms may perform poorly and may not be useable for certain applications. Navigation devices such as those embedded or included with mobile devices may not have access to data such as heading or other vehicular sensors.

Figure 9:
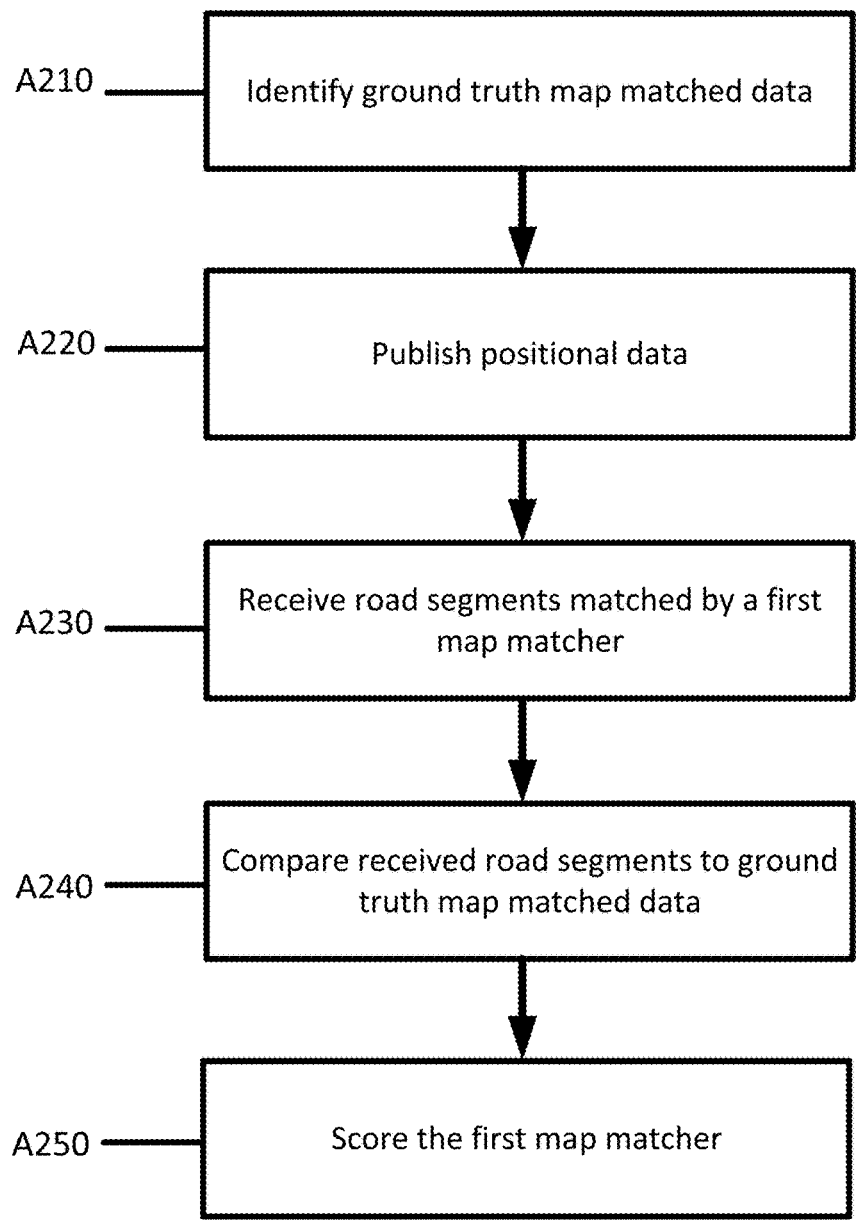
FIG. 9 illustrates an example workflow for evaluation map matching algorithms.

FIG. 9 illustrates an example workflow for evaluation map matching algorithms. As presented in the following sections, the acts may be performed using any combination of the components indicated in FIG. 2, FIG. 11, or FIG. 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210, ground truth map matched data is identified. The ground truth map matched data includes a plurality of positional data points and a plurality of candidate road segments matched to the plurality of positional data points by a ground truth map matcher. The ground truth map matched data may be generated by the workflow illustrated by FIG. 3. A server may identify a plurality of candidate road segments. A server may identify a route. Positional data is collected while traversing the route. The positional data is matched by the segments in the route.

At act A220, the positional data from the ground truth map matched data is published or transmitted. In certain embodiments, the server 125 may make available (publish) the positional data to a website or an external facing database. For example, a website may be generated that provides the positional data to clients for testing of their algorithms. The data may be published without the ground truth map matched segments. In certain embodiments, the positional data is provided or transmitted directly to client. In certain embodiments, the positional data may be accessible on the server 125 for internal testing of map matching algorithms. The published positional data (a plurality of positional points) may then be matched using one or more map matching algorithms. The map matching algorithms may be proprietary for a client or publicly available.

Figure 10:
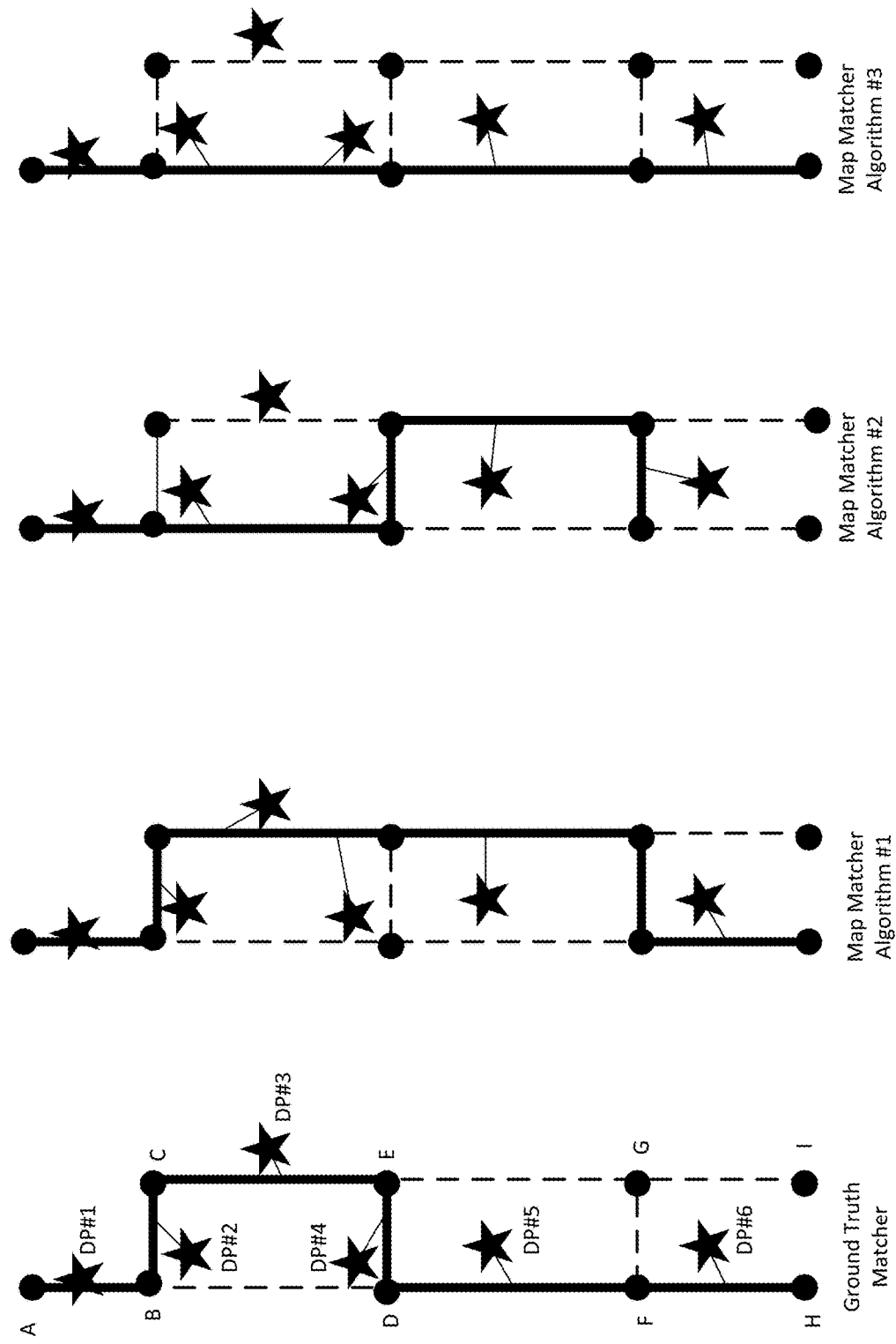
FIG. 10 illustrate example matched road segments.

A first map matcher matches each data positional data point to a plurality of first matched road segments. FIG. 10 depicts road segments matched by the ground truth map matcher and three other map matchers (Ground Truth Matcher, Map Matcher #1, Map Matcher #2, Map Matcher #3). The nodes are labeled from A to I. The road segments correspond to the node endpoints, (AB, BC, BD, CE, DF, DE, EG, FH, FG, and GI.). The stars (e.g. DP#1, DP#2, DP#3, DP#4, DP#5, DP#6) are the positional data points. The stars are connected to the road segments that are identified by the map matching algorithm. There are six positional data points DP#1-6 that are mapped to road segments by the map matchers. The nodes and positional data points are the same for the ground truth matcher and the map matching algorithms. The mapped road segments (shown with the solid line), however, are different for each algorithm. The road segments that are matched are listed below in Table 1.

TABLE 1

| Data Points | Ground Truth | MM#1 | MM#2 | MM#3 |
|---|---|---|---|---|
| 1 | AB | AB | AB | AB |
| 2 | BC | BC | BD | BD |
| 3 | CE | CE | XX | XX |
| 4 | ED | CE | DE | BD |
| 5 | DF | EG | EG | DF |
| 6 | FH | FH | GF | FH |

The ground truth map matcher includes positional data point 1 mapped to road segment AB, positional data point 2 mapped to road segment BC, and so on. Map matching algorithm #1 (MM#1) mapped positional data point 1 to road segment AB, positional data point 2 to road segment BC and so on. MM#1 is similar to the ground truth map matcher. However, MM#1 and the ground truth map matcher differ for positional data points 4 and 5. Certain positional data points may be matched to the wrong road (or wrong segment or road) because that road (segment or road) better satisfy map matching criteria for the particular algorithm. The ground truth map matcher identified the correct road segment ED for positional data point 4. MM#1 erroneously selects road segment CE.

Certain positional data points are not map matched at all when there is no suitable link candidate according to the particular map matcher algorithm. For example, map matchers only search for links within a certain radius. Any GPS point that fluctuates beyond the radius is not map matched (or matched to a wrong link). As shown in FIG. 10 and Table 1, both MM#2 and MM#3 are unable to identify a road segment for positional data point 3. As depicted in the example, the error may have occurred because both MM#2 and MM#3 have mismatched the previous road segment which then places positional data point 3 too far outside of any possible candidate road segment.

At act A230, the server 125 receives data representing the road segments matched by the first map matched road segments. The positional data published at in A220 may have been matched by one or more algorithms. The matching process generates candidate road segments. The candidate road segments may be transmitted by a client or device to the server. The server may receive the candidate road segments.

At act A240, the plurality of first matched road segments is compared the road segments matched by the ground truth map matcher. The information in FIG. 10 and Table 1 may be used to depict the comparison. For each map matching algorithm (MM#1, MM#2, MM#3), each road segment that is matched is compared to the correct road segment matched by the ground truth map matcher. For MM#1, the matched road segment for positional data point 1 (AB) is compared to the ground truth map matcher's road segment for positional data point 1. Both MM#1 and the ground truth map matcher matched positional data point 1 with road segment AB. Each positional data point is matched one by one. For MM#1, positional data points 1, 2, 3 and 6 are the same as the ground truth map matcher. For MM#2, only positional data point 1 is the same as the ground truth map matcher. When comparing positional data point 3 for MM#2, the server 125 may identify that MM#2 did not match the positional data point to any road segment. In this example, the comparison may indicate an incomplete mapping for MM#2 and positional data point 3. For MM#3, positional data points, 1, 5, and 6 were matched the same as the ground truth map matcher.

In certain embodiments, the comparison may identify how similar the road segments matched by the map matching algorithm is to the ground truth map matcher. For example, a match to a separate roadway may be treated differently than a match to a different lane. While both matches are incorrect, the first may have much greater consequences for an application.

At act A250, a score is generated based on the comparison. The score may include one or more components. For example, the score may include efficiency and purity. Efficiency is the fraction of map matched points out of the total number of points to be map matched. Purity is the fraction of correctly map matched points out of the total number of matched points. In certain embodiment, just the purity or efficiency is used to generate a score. Other metrics such as time to match or processing cycles required may be used to generate the score. For example, certain map matching algorithms may take longer to run or require additional resources, both of which may affect the use of the algorithm for a particular application.

In FIG. 10 and Table 1, each of the map matcher algorithms may be assigned a score. For MM#1, all six positional data points were matched to a road segment. For MM#, that gives an efficiency (fraction of map matched points out of the total number of points) of 100%. Both MM#2 and MM#3 were only able to match five out of six positional data points giving MM#2 and MM#3 both an efficiency score of 83%.

To calculate a score based on purity, the number of correctly matched points is divided by the total number of matched points. For MM#1, four out the six points were matched correctly giving a score of 66%. For MM#2, only one out of five points was matched correctly giving a score of 20%. For MM#3, three out of the five points were matched correctly giving a score of 60%.

A score may be generated for each set of ground truth data for each map matcher. A score may be generated for multiple sets of ground truth data for each map matcher. The scores for each set of ground truth data may be averaged or a median may be used. The score may be calculated for the total number of positional data points. For example, if one set had a purity score of 80% for 100 positional data points and a second set had a purity score of 90% for 1000 positional data points, the combine score might be calculated as (80+900)/1100 or (80+90)/2. A score may be generated for a subset of data from a set of ground truth data. For example, a score may be generated for only the urban geographic areas. A score may be generated for only a predefined number of positional data points (e.g. the ground truth data separated into blocks of 100 positional data points). When generating a score, certain sets of ground truth data may be excluded or weighted differently. When generating a score where urban matching is a priority, the urban geographic area positional data points or subsets may be given a higher weight.

Other types of scoring may be used. The examples shown above are binary, e.g. the road segments are either matched correctly or not. In certain embodiments, the similarity of a matched road segment, e.g. the road segment matched was incorrect, but only one lane over, may be used in generating a score. Such a near-miss may be given partial credit. So for example, using the six positional data points from FIG. 10, a map matching algorithm may score a 5.5 out of 6 for purity. Other scoring methods may be used, such as increasing a score when important waypoints were correctly matched. For example, positional data points surrounding a turn that is vital may be weighted higher than other positional data points.

A score may be generated for an application that uses more than one map matcher. A particular map matcher may perform better in certain geographic areas or regions. For example, a map matcher may be designed to be highly accurate in an urban area but may not perform as well in a suburban area. Map matchers may also be designed for certain countries or regions. Roadway construction may be different, for example, in the United States versus Europe or Central America or China. As such, a different map matcher may be used for different regions or geographic types. For example, if an application uses one map matcher algorithm for a first region and a second map matcher algorithm for a second region, and a third map matcher for a third region, ground truth data for each region may be used to generate scores for each region and then a combined total score for the application's results. An application may set a threshold efficiency and purity for a map matcher. If the application is being used in different regions, different map matchers may be used depending on the threshold. Additionally, each map matcher may be evaluated repeatedly over time with new sets of ground truth data.

A single set of ground truth data may be used to evaluate multiple map matching algorithms. In certain embodiments, multiple sets of ground truth data may be used to evaluate a single map matching algorithm. The scores from each set of data averaged and weighted to calculate a final score. Outliers may be excluded from the set of scores in order to obtain a representative score.

Scores may be published for each map matching algorithm or stored in a database. The map matching algorithms may be sortable by purity, efficiency, processing cycles, and speed for different types of regions or areas or transportation types or street types. For example, an application for positional tracking for pedestrians (or runners) may use a map matching algorithm that performs well for runners as opposed to vehicles. An application for trucking may use an algorithm that is accurate on major highways or rural areas. A delivery service may use an application that works well in a city that may have large GPS errors due to line of sight issues with buildings.

Scoring map matchers may be offered as a service to users or application developers. Existing map matching algorithms or services may be tested and scored with the ground truth data. New or altered map matching algorithms may also be tested as the algorithms are developed in order to quickly and efficiently find errors or issues.

A server 125 may be configured to offer the map matching scores as a service. The server 125 may be configured to receive detailed route data, GPS probe locations and map matched positions. The server 125 provides results and a comparison using ground truth map matched data. The server 125 may be used by a client to develop, test, improve and validate its map matching algorithm.

Figure 11:
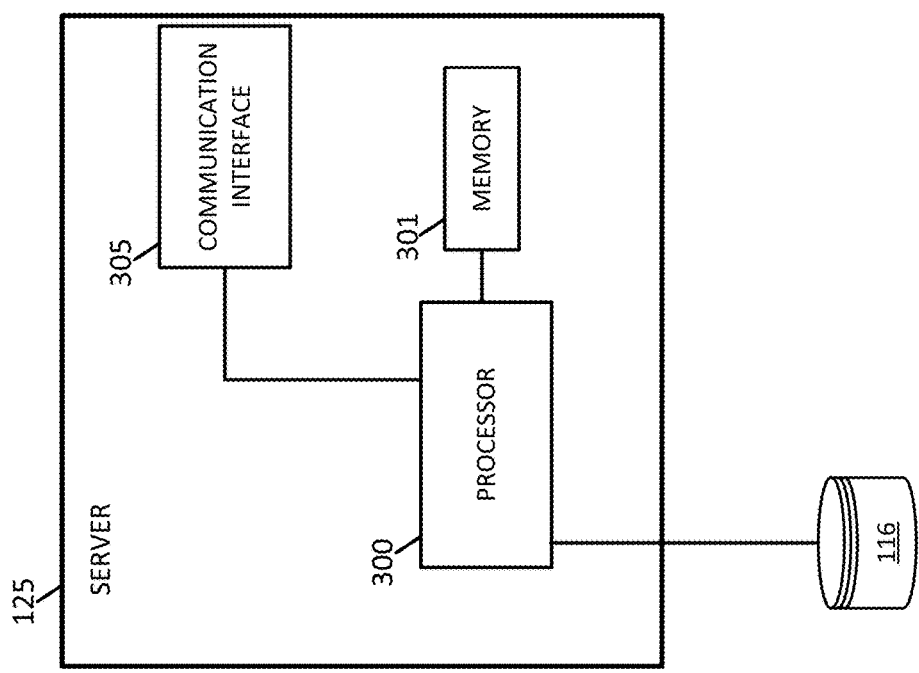
FIG. 11 illustrates an example server of the system of FIG. 2.

FIG. 11 illustrates an example server 125 of the system of FIG. 2. The server 125 includes a processor 300 that is connected to a communications interface 305 and a memory 301. The processor 300 is also connected to the database 116. The communications interface 305 is configured to receive probe reports from one or more probes or devices 122. The memory 301 is configured to store received ground truth data. The processor is configured to score map matching algorithms. Additional, different, or fewer components may be included.

The server 125 may be a host for a website or web service such as a mapping service, a navigation service, and/or a map matching service. The mapping service may provide maps generated from the geographic data of the database 116, and the navigation service may generate routing or other directions from the geographic data of the database 116. The map matching service may provide ground truth data for evaluating map matching services. The map matching service may further evaluate received map matching algorithms. The mapping service may also provide information generated from attribute data included in the database 116. The server 125 may also provide historical, future, recent or current traffic conditions for the links, road segments, paths, or routes using historical, recent, or real time collected data.

The server 125 may be configured to identify a map matching algorithm. A map matching algorithm is an algorithm that takes positional data points and matches the points to a road segment. Different algorithms uses different method for matching, including positional distance, prior road segments, heading, and/or speed among others. Different algorithms may match a positional point to different road segments. Using stored ground truth map matched data from memory 301, the server 125 may be configured to score each different map matching algorithm.

In certain embodiments, a client or user may prefer not to transmit a map matching algorithm. The server 125 may be configured to publish positional data points and received map matched segments from a map matching algorithm. The server 125 may be configured to score a map matching algorithm by calculating the purity or efficiency of the map matching algorithm when run on a set of ground truth map matched data. The ground truth map matched data may include positional data and matched road segments. The server 125 runs a map matching algorithm on the positional data points or receives the results of a map matching algorithm on the positional data points and compares the results to the matched road segments. An efficiency score is the percentage of positional data points matched out of the total number of positional data points. Purity if the number of positional data points correctly matched to the matched road segments by the map matching algorithm.

Different map matching algorithms may be stored in memory 301. In certain embodiments, the results from different map matching algorithms may be stored in memory 301. In certain embodiments, results from a map matching algorithm or a map matching algorithm are received from the network 127. As illustrated in FIGS. 2 and 11, the server 125 is connected to the network 127 using the communication interface 305. The server 125 may receive or transmit data through the network 127. The server 125 may also transmit paths, routes, map matching, or map matching score data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The communication interface 305 may include any operable connection. An operable connection may be one in which signals, physical communications, and/or logical communications may be sent and/or received. An operable connection may include a physical interface, an electrical interface, and/or a data interface. The communication interface 305 provides for wireless and/or wired communications in any now known or later developed format. The communication interface 305 may include a receiver/transmitter for digital radio signals or other broadcast mediums.

The server 125 may be configured to receive a map matching algorithm to evaluate from a user or application. The server 125 may be configured to receive map matched road segments from publish positional data. For example, the server 125 may include a website or network enabled connection that allows a user to input or upload an algorithm. In certain embodiments, the user may instead upload or input the positional data points and the results of a map matching algorithm without uploading the algorithm.

The server 125 may be configured to receive one or more map matching algorithms or map matched results, score each algorithm and then select an algorithm based on the scores. The server 125 may publish a list of algorithms and the scores for each algorithm. The scores may be updated based on new ground truth data collected and/or received. The algorithms may be sorted by scores for separate types of ground truth data, for example, by type of transportation, road type, geographic region etc.

The map matching server 125 and the data stored within memory and/or database may be licensed or delivered on-demand. Other navigational services or traffic providers may access the map matching score data. Data including the map matching score data for a link may be broadcast as a service or published to a website for review.

The server 125 may use ground truth data collected from one or more devices 122. The ground truth data may include both the positional data and a route taken by the device 122. The one or more devices 122 may include probe devices, probe sensors, or other devices 122 such as personal navigation devices 122 or connected vehicles. The server 125 may communicate with the devices 122 through the network 127. The devices 122 may be a mobile device or a tracking device that provides samples of data for the location of a person or vehicle. The devices 122 may include mobile phones running specialized applications that collect location data as the devices 122 are carried by persons or things traveling the roadway system. The devices 122 may also be integrated in or with a vehicle. The devices 122 may be configured to collect and transmit data including positional, speed, and temporal data. The devices 122 may be configured to collect and transmit data including data from sensors on or about a vehicle.

Figure 12:
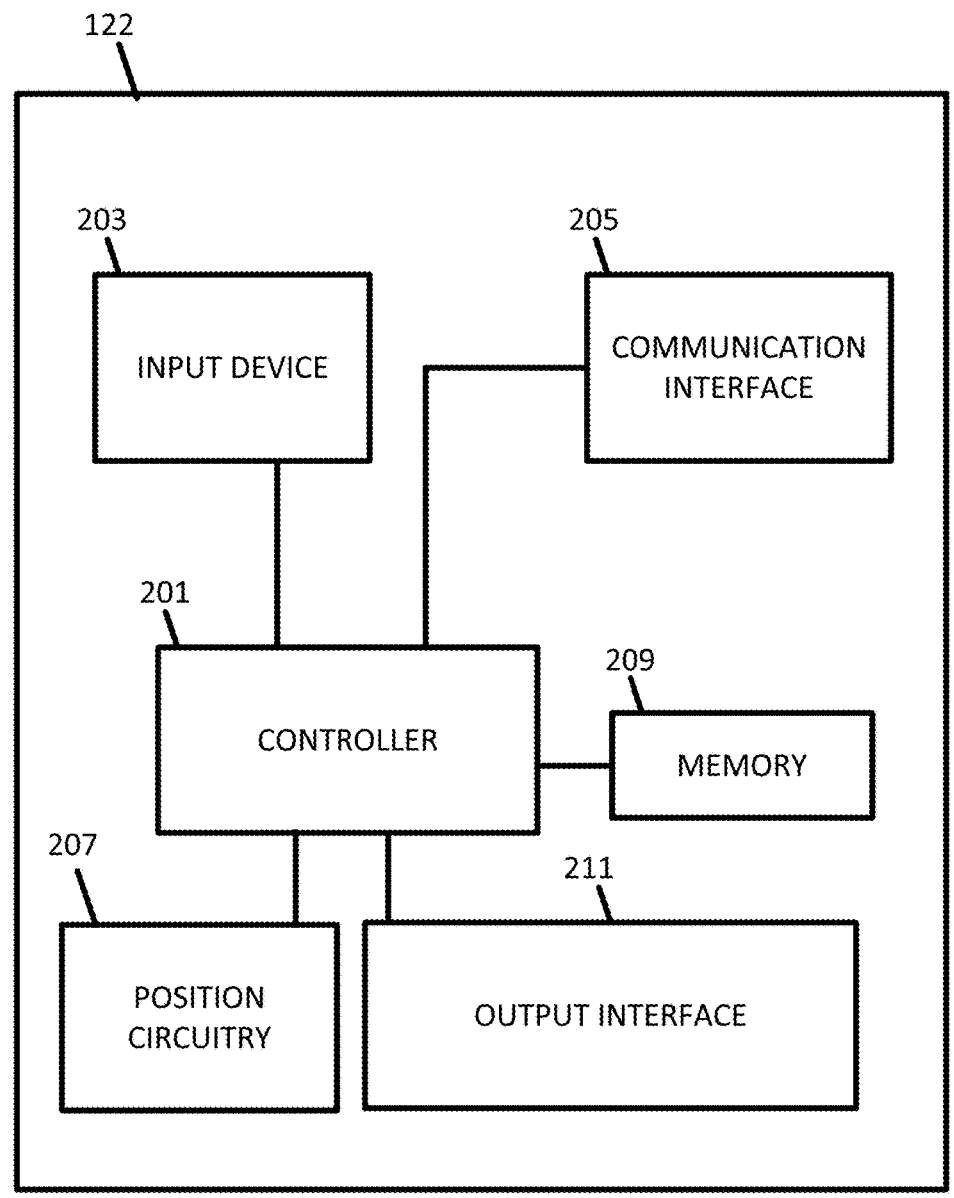
FIG. 12 illustrates an example device of the system of FIG. 2.

FIG. 12 illustrates an example device 122 of the system of FIG. 2. The device 122 may be configured to collect, transmit, receive, process, or display data. The device 122 may also be referred to as a probe 122, a mobile device 122 or a navigation device 122. The device 122 includes a controller 201, a memory 209, an input device 203, a communication interface 205, position circuitry 207, movement circuitry 208, and an output interface 211. The output interface 211 may present visual or non-visual information such as audio information. Additional, different, or fewer components are possible for the mobile device 122. The device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

A device 122 may be configured to identify a present location of the device 122 or vehicle. The starting location and destination may be identified though the input device 203. The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen that may be capacitive or resistive. The output interface 211 may be a liquid crystal display (LCD) panel, light emitting diode (LED) screen, thin film transistor screen, or another type of display. The output interface 211 may also include audio capabilities, or speakers.

The location of a device 122 may be identified using positional circuitry such as GPS or other positional inputs. The positioning circuitry 207, which is an example of a positioning system, is configured to determine a geographic position of the device 122. The movement circuitry 208, which is an example a movement tracking system, is configured to determine movement of a device 122. The position circuitry 207 and the movement circuitry 208 may be separate systems, or road segments of the same positioning or movement circuitry system. In an embodiment, components as described herein with respect to the navigation device 122 may be implemented as a static device. For example, such a device may not include movement circuitry 208, but may involve a speed or velocity detecting input device 203. The device 122 may identify its position as the device 122 travels along a route using the positional circuitry. For indoor spaces without GPS signals, the device 122 may rely on other geolocations methods such as LIDAR, radar, Wi-Fi, beacons, landmark identification, inertial navigation (dead reckoning), among others.

The memory 209 and/or memory 301 may be a volatile memory or a non-volatile memory. The memory 209 and/or memory 301 may include one or more of a read only memory (ROM), random access memory (RAM), a flash memory, an electronic erasable program read only memory (EEPROM), or other type of memory. The memory 209 and/or memory 301 may be removable from the mobile device 122, such as a secure digital (SD) memory card. The memory may contain a locally stored geographic database or link node routing graph. The locally stored geographic database may be a copy of the geographic database 116 or may include a smaller piece. The locally stored geographic database may use the same formatting and scheme as the geographic database 116.

The device 122 may determine a route or path from a received or locally geographic database using the controller 201. The device 122 may be integrated into an autonomous vehicle or a highly assisted driving (HAD) vehicle. The device 122 may be configured as a navigation system for an autonomous vehicle or a HAD. An autonomous vehicle or HAD may take route instruction based on the link and node information provided to the device 122.

As described herein, an autonomous driving vehicle may refer to a self-driving or driverless mode that no passengers are required to be on board to operate the vehicle. An autonomous driving vehicle may be referred to as a robot vehicle or an autonomous driving vehicle. The autonomous driving vehicle may include passengers, but no driver is necessary. Autonomous driving vehicles may park themselves or move cargo between locations without a human operator. Autonomous driving vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode that the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for evaluating a first map matcher using automatically generated ground truth data, the method comprising:
   identifying, by a processor, a route selected by a navigation device comprising one or more road segments;
   receiving, by the processor, positional data points collected while the navigation device travels the route;
   identifying, by the processor, a plurality of candidate road segments including at least the one or more road segments;
   generating, automatically by the processor, ground truth data by selecting one of the plurality of candidate road segments for each of the positional data points, wherein the one or more road segments are prioritized for selection;
   map matching, by the processor, using the first map matcher, each of the positional data points to one of the plurality of candidate road segments;
   comparing, by the processor, the first map matcher map matched positional data points to the ground truth data;
   scoring, by the processor, the first map matcher based on the comparison;
   map matching, by the processor, using a second map matcher, each of the positional data points to one of the plurality of candidate road segments;
   comparing, by the processor, the second map matcher map matched positional data points to the ground truth data;
   scoring, by the processor, the second map matcher based on the comparison; and
   selecting, by the processor, the first map matcher or second map matcher based on the scoring of the first map matcher and second map matcher.

2. The method of claim 1, wherein the plurality of candidate road segments are road segments located within a threshold distance from the route.

3. The method of claim 1, further comprising:
   generating ground truth data for a plurality of routes selected and travelled by the navigation device.

4. The method of claim 1, wherein the positional data points are derived from a Global Positioning System (GPS) receiver.

5. The method of claim 1, wherein generating ground truth data comprises:
   identifying, by the processor, a distance from a positional data point to each of the plurality of candidate road segments; and
   selecting, by the processor, a closest road segment from the one or more road segments to the positional data point.

6. The method of claim 1, wherein generating ground truth data comprises:
   identifying, by the processor, a prior road segment in the route;
   identifying, by the processor, a subsequent road segment in the route; and
   selecting, by the processor, a road segment from the one or more road segments for a positional data point that is after or equal to the prior road segment and before or equal to the subsequent road segment.

7. A method for evaluating different map matchers using ground truth map matched data, the method comprising:
   acquiring, by a processor, ground truth map matched data; the ground truth map matched data generated automatically by matching a plurality of positional data points and a plurality of ground truth matched road segments by prioritizing matching to road segments in a selected route;
   publishing, by the processor, the plurality of positional data points;
   receiving, by the processor, first matched data including the plurality of positional data points and a plurality of first matched road segments matched by a first map matcher;
   comparing, by the processor, the plurality of first matched road segments with the plurality of ground truth matched road segments;
   scoring, by the processor, the first map matcher based on the comparison;
   receiving, by the processor, second matched data including the plurality of positional data points and a plurality of second matched road segments matched by a second map matcher;
   comparing, by the processor, the plurality of second matched road segments with the plurality of ground truth matched road segments;
   scoring, by the processor, the second map matcher based on the comparison; and
   selecting, by the processor, the first map matcher or second map matcher based on the highest score between the first map matcher and second map matcher.

8. The method of claim 7, wherein the ground truth matched data is derived from positional data points collected while driving the selected route.

9. The method of claim 7, wherein the ground truth matched data is derived from positional data points collected while bicycling the selected route.

10. The method of claim 7, wherein scoring comprises:
    calculating, by the processor, a fraction of the plurality of positional data points that have a similar first matched road segment and ground truth matched road segment.

11. The method of claim 10, wherein similar first matched road segment and ground truth matched road segment are the same segments.

12. The method of claim 7, further comprising:
    receiving, by the processor, an amount of time for matching with the first map matcher; wherein scoring is further based on the amount of time.

13. The method of claim 7, further comprising:
receiving, by the processor, an amount of processing cycles used for matching with the first map matcher; wherein scoring is further based on the amount of processing cycles.

14. The method of claim 7, wherein the ground truth map matched data is from a geographic region and the scoring is only for the geographic region.

15. An apparatus for evaluating map matchers using positional data and matched road segments from ground truth map matched data, the apparatus comprising:
- at least one processor; and
- at least one memory including computer program code for one or more programs; the at least one memory configured to store the computer program code configured to, with the at least one processor, cause the apparatus to at least perform:
- publish the positional data included in the ground truth map matched data stored in the at least one memory;
- receive first candidate map matched segments matched using a first map matcher and the positional data;
- score the first map matcher based on the first candidate map matched segments and the ground truth map matched data stored in the at least one memory; wherein the score represents an effectiveness of the first map matcher;
- receive second candidate map matched segments matched using a second map matcher and the positional data;
- score the second map matcher based on the ground truth map matched data stored in the at least one memory; and
- select the first or second map matcher based on the scores.

16. The apparatus of claim 15, wherein the ground truth map matched data includes a route and related positional data derived from a GPS receiver while traveling the route.

17. The apparatus of claim 15, wherein the at least one memory and computer program code are configured to cause the apparatus to further perform:
- alter the first map matcher; and
- score the altered first map matcher.

* * * * *